(12) United States Patent
Kaplan

(10) Patent No.: US 7,908,806 B2
(45) Date of Patent: Mar. 22, 2011

(54) CABLE AND OVERLAY MOLDINGS

(75) Inventor: Steven E. Kaplan, Elyria, OH (US)

(73) Assignee: Multilink, Inc., Elyria, OH (US)

( * ) Notice: Subject to any disclaimer, the term of this patent is extended or adjusted under 35 U.S.C. 154(b) by 0 days.

(21) Appl. No.: 12/403,636

(22) Filed: Mar. 13, 2009

(65) Prior Publication Data

US 2009/0173023 A1    Jul. 9, 2009

Related U.S. Application Data

(62) Division of application No. 11/413,865, filed on Apr. 28, 2006, now abandoned.

(51) Int. Cl.
  E04B 2/00    (2006.01)
  E04C 2/52    (2006.01)
(52) U.S. Cl. .................. 52/287.1; 52/220.5; 174/492
(58) Field of Classification Search ............... 52/287.1, 52/288.1, 220.5, 220.1, 211, 212; 362/147, 362/151; 174/480, 481, 68.1, 68.3, 492, 174/504
See application file for complete search history.

(56) References Cited

U.S. PATENT DOCUMENTS

| | | | |
|---|---|---|---|
| 85,312 A | 12/1868 | Kimball | |
| 1,998,234 A | 4/1935 | Grimes | |
| 2,107,915 A | 2/1938 | Tashjian | |
| 2,359,505 A | 10/1944 | Barnes | |
| 2,528,132 A * | 10/1950 | Gibson et al. | 362/151 |
| 2,771,970 A | 11/1956 | Geyser | |
| 2,917,789 A | 12/1959 | Le Bon, III | |
| 3,302,350 A | 2/1967 | Brown et al. | |
| 3,321,878 A | 5/1967 | Brown et al. | |
| 3,405,488 A | 10/1968 | Nelson | |
| 3,707,061 A | 12/1972 | Collette et al. | |
| 3,721,762 A | 3/1973 | Gooding | |
| 4,165,577 A | 8/1979 | Shanahan et al. | |
| 4,246,629 A * | 1/1981 | Marrero | 362/147 |
| 4,627,679 A * | 12/1986 | Billette de Villemeur et al. | 439/113 |
| 4,942,271 A * | 7/1990 | Corsi et al. | 174/101 |
| 4,986,332 A * | 1/1991 | Lanuza | 160/327 |
| 5,024,614 A * | 6/1991 | Dola et al. | 439/114 |
| 5,179,811 A * | 1/1993 | Walker et al. | 52/288.1 |
| 5,243,800 A * | 9/1993 | Olbrich | 52/287.1 |
| 5,274,972 A | 1/1994 | Hansen | |
| 5,336,849 A * | 8/1994 | Whitney | 174/72 C |
| 5,398,469 A | 3/1995 | Logan | |
| 5,426,901 A * | 6/1995 | Indracek | 52/288.1 |
| 5,457,923 A | 10/1995 | Logan et al. | |
| 5,459,810 A * | 10/1995 | Villa | 392/352 |
| 5,598,681 A | 2/1997 | DiGianni | |
| 5,651,224 A * | 7/1997 | Brabant | 52/288.1 |
| 5,694,726 A | 12/1997 | Wu | |
| 5,732,747 A * | 3/1998 | Holliday | 138/163 |
| 6,084,180 A * | 7/2000 | DeBartolo et al. | 174/95 |

(Continued)

*Primary Examiner* — Robert J Canfield
*Assistant Examiner* — Brent W Herring
(74) *Attorney, Agent, or Firm* — Renner, Otto, Boisselle & Sklar, LLP

(57) ABSTRACT

A cable molding primarily intended to be installed on a wall structure of a common hallway of a multiple dwelling unit below pre-existing molding, and an overlay molding attachable to the cable molding to conceal both the cable molding and the pre-existing molding. The overlay molding includes a panel member having upper and lower edges and a flange extending rearwardly from the panel member intermediate the upper and lower edges. The flange defines with a lower portion of the panel member a lower channel shaped for attachment to the cable member, and defines with an upper portion of the panel member an upper channel for receiving pre-existing molding.

11 Claims, 2 Drawing Sheets

U.S. PATENT DOCUMENTS

| | | | |
|---|---|---|---|
| 6,191,363 B1 * | 2/2001 | Samuels ..................... 174/68.3 |
| 6,323,421 B1 | 11/2001 | Pawson et al. |
| 6,385,939 B1 * | 5/2002 | Stout ........................... 52/718.01 |
| 6,469,250 B1 * | 10/2002 | Decore et al. ................... 174/95 |
| 6,513,289 B1 * | 2/2003 | Decore et al. ................. 52/288.1 |
| 6,557,311 B1 | 5/2003 | Mongelli |
| 6,727,434 B2 * | 4/2004 | Jadaud et al. ................. 174/135 |
| 6,736,522 B1 * | 5/2004 | Cini ............................... 362/145 |
| 6,786,016 B1 * | 9/2004 | Wood ............................. 52/290 |
| 6,883,282 B1 * | 4/2005 | Newhart, III ................ 52/287.1 |
| 7,111,433 B2 | 9/2006 | Kerscher |
| 7,193,159 B2 * | 3/2007 | Makwinski et al. .......... 174/480 |
| 7,262,371 B2 * | 8/2007 | Makwinski et al. .......... 174/481 |
| 7,370,453 B2 * | 5/2008 | Puzio ........................... 52/287.1 |
| 7,456,366 B2 * | 11/2008 | Makwinski et al. .......... 174/481 |
| 7,574,836 B2 * | 8/2009 | Wesolowska ................ 52/288.1 |
| 2003/0106702 A1 * | 6/2003 | Seamans et al. ................ 174/48 |
| 2003/0145538 A1 | 8/2003 | Kerscher |
| 2006/0207793 A1 * | 9/2006 | Stempinski ................... 174/481 |
| 2007/0271865 A1 * | 11/2007 | Rowohlt ...................... 52/287.1 |
| 2008/0041623 A1 * | 2/2008 | Makwinski et al. .......... 174/481 |
| 2008/0092470 A1 | 4/2008 | Jackson |
| 2010/0071288 A1 * | 3/2010 | Jun ............................... 52/288.1 |

* cited by examiner

CABLE AND OVERLAY MOLDINGS

CROSS-REFERENCE TO RELATED APPLICATIONS

This application is a division of U.S. patent application Ser. No. 11/413,865, filed Apr. 28, 2006, the entire disclosure of which is incorporated herein by reference.

FIELD OF THE INVENTION

This invention relates to a cable molding for installation along a common hallway of a multiple dwelling unit for running cable to provide network or broadband cable service to one or more of the units and to an overlay molding that is attachable to the cable molding for concealing or covering the cable molding and any pre-existing molding.

BACKGROUND OF THE INVENTION

Whenever a network or broadband cable service provider is called upon to provide cable service to a number of multiple dwelling units in a building structure, cable molding is typically run along common hallways in the building to the different units for housing the cable. The hallways may already have crown or cove molding, and in some cases, some other type of molding such as cable molding installed by another network service provider, necessitating that the new cable molding be installed below the existing molding to create a parallel pathway below the existing molding. In most cases this may be considered objectionable because of the potentially unsightly appearance of having two or more exposed moldings of possibly different colors, shapes and/or styles running along the same hallways.

SUMMARY OF THE INVENTION

The present invention addresses the foregoing objections by providing a cable molding which, after installation on a wall structure of a common hallway of a multiple dwelling unit below pre-existing molding, may have an overlay molding attached thereto for concealing both the newly installed cable molding and the pre-existing molding.

In accordance with one aspect of the invention, the overlay molding includes a panel member having upper and lower edges and a flange extending rearwardly from the panel member intermediate the upper and lower edges that defines with a lower portion of the panel member a lower channel for receiving the cable molding.

In accordance with another aspect of the invention, the flange and lower portion of the panel member may be shaped to provide a snap fit of the overlay molding onto the cable molding with the upper and lower edges of the overlay molding in close proximity to the hallway ceiling and wall structure, respectively, to which the cable molding is attached.

In accordance with another aspect of the invention, the flange may define with the upper portion of the panel member an upper channel for receiving at least one other molding attached to the wall structure above the cable molding.

In accordance with another aspect of the invention, the cable molding may be in the shape of a channel or keeper including a back side that is attachable to the wall structure, upper and lower sides, and an open front that is at least partially closed by a flexible flap that is sufficiently rigid to keep cable within the channel but may be flexed enough for easy insertion of the cable into the channel and removal therefrom without cutting or otherwise damaging the cable.

In accordance with another aspect of the invention, the cable molding including the flexible flap may be made of plastic, and the flexible flap may be co-extruded onto an edge of the open front of the cable molding.

These and other objects, advantages, features and aspects of the present invention will become apparent as the following description proceeds.

To the accomplishment of the foregoing and related ends, the invention, then, comprises the features hereinafter more fully described and particularly pointed out in the claims, the following description and the annexed drawings setting forth in detail certain illustrative embodiments of the invention, these being indicative, however, of but several of the various ways in which the principles of the invention may be employed.

DETAILED DESCRIPTION OF THE INVENTION

Figure 1:
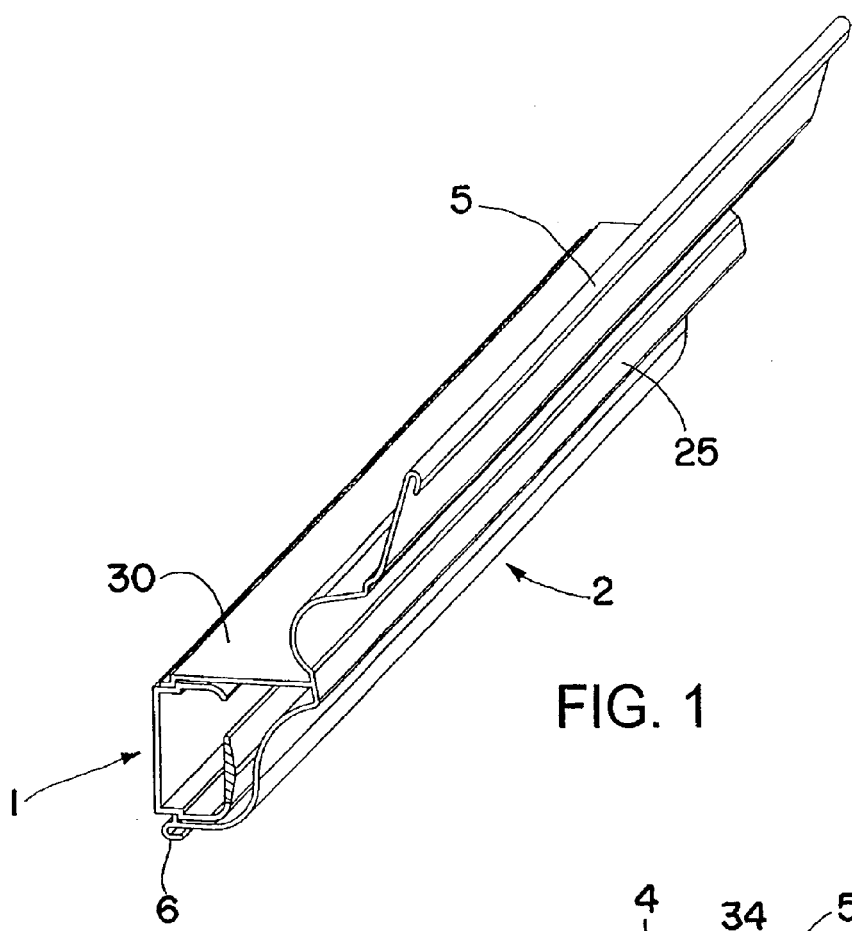
FIG. 1 is a fragmentary perspective view of one form of cable molding and overlay molding of the present invention showing the overlay molding snap fitted onto the cable molding.
Figure 2:
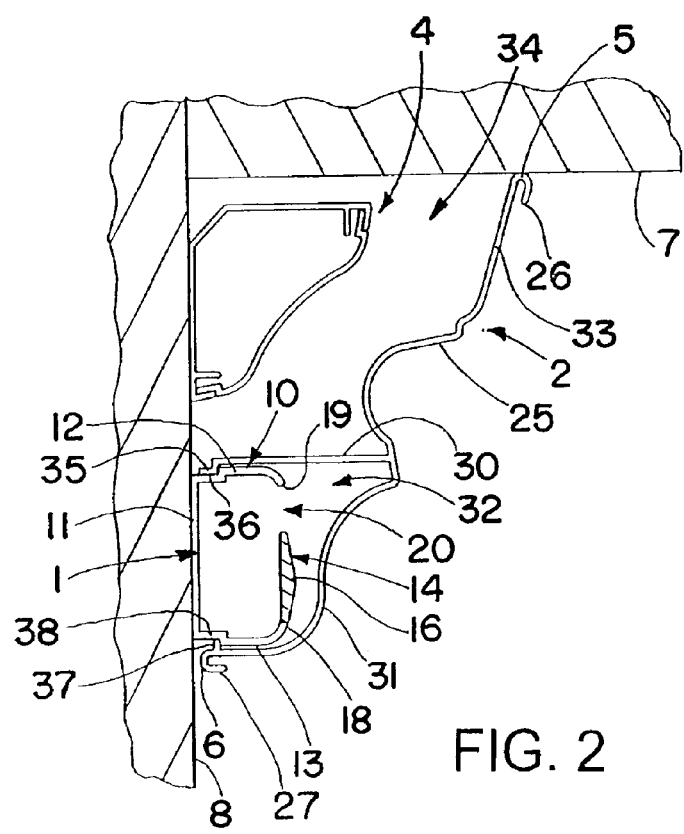
FIG. 2 is an end elevation view of the cable molding and overlay molding of FIG. 1 schematically showing the cable molding attached to a wall structure below a pre-existing molding and the overlay molding snap-fitted onto the cable molding to cover both the cable molding and the pre-existing molding.

Referring now more particularly to the drawings, wherein like reference numerals are used to designate like parts, and initially to FIGS. 1 and 2, there is shown one form of cable molding 1 and overlay molding 2 of the present invention. The cable molding 1 is primarily intended to be installed along a common hallway of a multiple dwelling unit below pre-existing molding 4 to create a parallel pathway below the pre-existing molding for running cable to provide network or broadband cable service to one or more of the units. The pre-existing molding may simply be crown or cove molding, but could also be cable molding installed by some other cable service provider for providing cable service to other units in the same building.

Having two (or more) exposed moldings running along the same hallway may be objectionable for any number of reasons, including for example differences in color, style, size and/or shape. To eliminate any possible objections, once the cable molding 1 of the present invention is installed below the pre-existing molding 4, the overlay molding 2 of the present invention may be snap fitted onto the newly installed cable molding 1 with its upper and lower edges 5, 6 in close proximity to the ceiling 7 and wall 8, respectively, to conceal both the newly installed cable molding 1 and the pre-existing molding 4 as schematically shown in FIG. 2.

Cable molding 1 is in the shape of a molded plastic channel or keeper 10 having a back wall 11 that is attachable to the building wall 8, upper and lower sides 12, 13 and an open front 14 that is at least partially closed by a flexible plastic flap 16 that is sufficiently rigid to keep the cable (not shown)

within the channel 10 but may be flexed enough for easy insertion of the cable into the channel and removal therefrom without cutting or otherwise damaging the cable. Also the flap 16 may be flexed outwardly to expose a substantial portion of the channel back wall 11 through the open front 14 for ease of attaching the channel back wall to the wall structure 8 using suitable fasteners such as screws or nails or the like (not shown).

Figure 3:
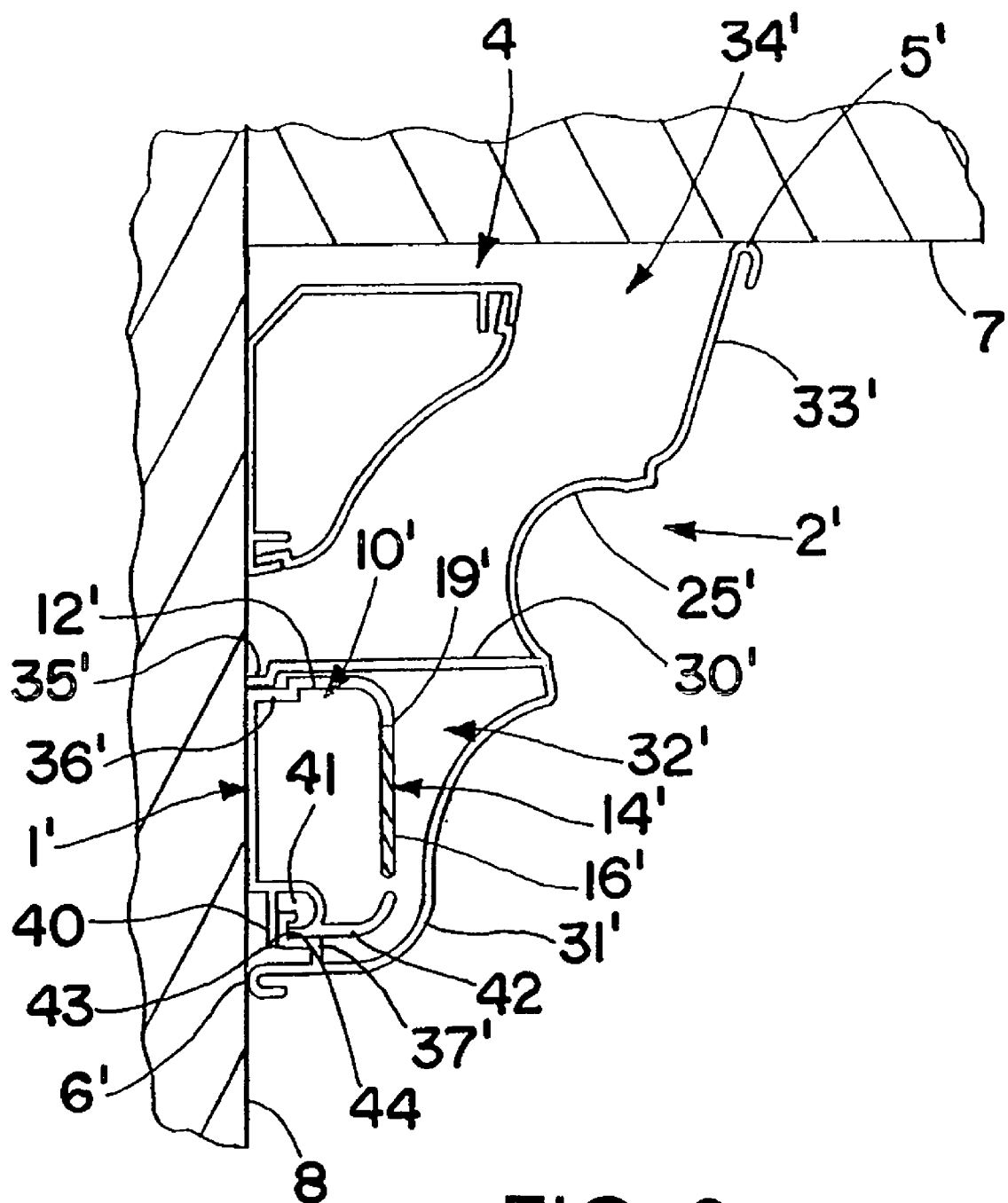
FIG. 3 is an end elevation view similar to FIG. 2 but showing another form of cable molding and overlay molding of the present invention with the cable molding attached to a wall structure below a pre-existing molding and the overlay molding snap-fitted onto the cable molding to cover both the cable molding and the pre-existing molding.

The flexible flap 16 may be co-extruded onto the bottom edge 18 of the open front 14 of the channel as shown in FIGS. 1 and 2 or onto the top edge 19' of the open front 14' as shown in FIG. 3. If co-extruded onto the top edge 19', the flexible flap 16' desirably closes virtually the entire open front 14', whereas if co-extruded onto the bottom edge 18, a larger gap 20 may be left between the upper edge of the flexible flap and the top edge 19 of the open front as shown in FIG. 2.

The overlay molding 2 comprises a panel member 25 including the upper and lower edges 5, 6 that are maintained in close proximity to the ceiling 7 and wall 8, respectively, of the hallway once the cable molding 1 is properly installed on the wall below the pre-existing molding 4 and the overlay molding is properly snap fitted onto the cable molding 1 as described hereafter. Panel member 25 may have different shapes depending on the molding style desired, for example, colonial, traditional, modern, etc. The upper and lower edges 5, 6 of the panel member may have downturned and inturned lips 26, 27, respectively, to facilitate attachment of corner pieces to the overlay molding where needed.

Extending rearwardly from panel member 25 intermediate the upper and lower edges 5, 6 is a flange 30 that defines with a lower portion 31 of the panel member a lower channel 32 for receiving the cable molding 1. In addition, flange 30 defines with an upper portion 33 of the panel member an upper channel 34 for receiving the pre-existing molding 4 attached to the wall structure 8 above the cable molding 1.

Both the flange 30 and lower portion 31 of the panel member may have stepped surfaces or ribs extending toward each other to provide a snap fit with corresponding mating surfaces on the upper and lower sides of the cable molding. In the embodiment shown in FIGS. 1 and 2, flange 30 has a downwardly stepped inner end 35 that is mateable with a correspondingly shaped step 36 in the upper side 12 of the cable molding 1 and the lower portion 31 of the panel member has an upwardly extending rib 37 adjacent its inner end that is engageable with a step 38 in the lower side 13 of the cable molding 1 to provide a snap fit of the overlay molding onto the cable molding.

In the embodiment shown in FIG. 3, the flange 30' also has a downwardly stepped inner end 35' that is receivable in a correspondingly shaped step 36' in the upper side 12' of the cable molding 1' and the lower portion 31' of the panel member 25' has an upwardly extending rib 37' adjacent its inner end. However, cable molding 1' has a slot 40 communicating with a recess or groove 41 in the lower side 42 of the cable molding to provide a snap fit of the overlay molding 2' onto the cable molding. Also the rib 37' may include an outwardly facing channel 43 at its uppermost end that matingly receives a rearwardly facing edge 44 of the cable molding slot 40. Otherwise, the cable molding 1' and overlay molding 2' shown in FIG. 3 are substantially the same as the cable molding 1 and overlay molding 2 shown in FIGS. 1 and 2. Accordingly, the same reference numbers followed by a prime symbol (') are used to designate like parts.

If need be, the overlay molding 2 or 2' can easily be removed by pulling the overlay molding off the cable molding 1 or 1' onto which it has been snap fitted, to allow access to either the pre-existing molding 4 (which may be a cable molding installed by another cable service provider) or the newly installed cable molding 1 or 1' by a second cable service provider.

Although the invention has been shown and described with respect to certain embodiments, it is obvious that equivalent alterations and modifications will occur to others skilled in the art upon the reading and understanding of the specification. In particular, with regard to the various functions performed by the above-described components, the terms (including any reference to a "means") used to describe such components are intended to correspond, unless otherwise indicated, to any component which performs the specified function of the described component (e.g., that is functionally equivalent), even though not structurally equivalent to the disclosed component which performs the function of the herein illustrated exemplary embodiments of the invention. In addition, while a particular feature of the invention may have been disclosed with respect to only one embodiment, such feature may be combined with one or more other features as may be desired and advantageous for any given or particular application.

What is claimed is:

1. In combination, a cable molding attached to a vertical wall of a building structure in vertical spaced relation from a ceiling of the building structure, and an overlay molding fitted onto the cable molding for concealing the cable molding, the overlay molding comprising a panel member having upper and lower edges and a flange extending rearwardly from the panel member intermediate the upper and lower edges, the flange defining with a lower portion of the panel member a lower channel in which the cable molding is completely received, the flange and lower edge of the panel member being shaped to provide attachment of the overlay molding to the cable molding with the upper edge of the overlay molding extending upwardly in close proximity to the ceiling and the lower edge of the overlay molding extending rearwardly in close proximity to the wall of the building structure.

2. The combination of claim 1 wherein the flange defines with an upper portion of the panel member an upper channel in which at least one other molding that is attached to the wall of the building structure above the cable molding is received.

3. The combination of claim 2 wherein the other molding is a crown or cove molding or another cable molding.

4. The combination of claim 1 wherein the cable molding is a molded plastic channel including a back side that is attached to the building structure wall, upper and lower sides, and an open front that is at least partially closed by a flexible plastic flap that is co-extruded onto an edge of the open front of the cable molding, the flexible flap being outwardly flexible relative to the edge of the open front for placing cable within the cable molding through the open front and removal therefrom without cutting or otherwise damaging the cable.

5. The combination of claim 1 wherein the flange and lower portion of the panel member are shaped to provide a snap fit of the overlay molding onto the cable molding.

6. The combination of claim 1 wherein the flange of the overlay molding has a downwardly stepped inner end that is engaged with a corresponding step in an upper side of the cable molding.

7. The combination of claim 6 wherein the lower portion of the panel member is releasably connected to a lower side of the cable molding.

8. The combination of claim 6 wherein the lower portion of the panel member has an upwardly extending rib that is engaged with another step in a lower side of the cable molding to provide a snap fit of the overlay molding onto the cable molding.

9. The combination of claim 6 wherein the lower portion of the panel member has a vertical rib that is received in a downwardly opening recess in a lower side of the cable molding.

10. The combination of claim 9 wherein the lower side of the cable molding has a vertical slot intermediate its length communicating with the recess into which the vertical rib on the lower portion of the panel member of the overlay molding is received.

11. The combination of claim 10 wherein the vertical rib includes an outwardly facing channel in which a rearwardly facing edge of the cable molding slot is received.

\* \* \* \* \*